United States Patent
Li et al.

(10) Patent No.: US 9,431,894 B2
(45) Date of Patent: Aug. 30, 2016

(54) INDUCTANCE VARIATION BASED COMPENSATION IN BOOST CONVERTER

(71) Applicant: NXP B.V., Eindhoven (NL)

(72) Inventors: Dong Li, Singapore (SG); Chan Yoke Cheong, Singapore (SG)

(73) Assignee: NXP B.V., Eindhoven (NL)

( * ) Notice: Subject to any disclaimer, the term of this patent is extended or adjusted under 35 U.S.C. 154(b) by 1 day.

(21) Appl. No.: 14/473,146

(22) Filed: Aug. 29, 2014

(65) Prior Publication Data

US 2016/0065054 A1    Mar. 3, 2016

(51) Int. Cl.
*H02M 1/42* (2007.01)
*H02M 3/156* (2006.01)
*H02M 7/217* (2006.01)
*H02M 1/00* (2006.01)

(52) U.S. Cl.
CPC ......... *H02M 1/4208* (2013.01); *H02M 1/4225* (2013.01); *H02M 3/156* (2013.01); *H02M 7/217* (2013.01); *H02M 2001/0016* (2013.01); *H02M 2001/0025* (2013.01)

(58) Field of Classification Search
CPC .... H02M 1/42; H02M 1/4225; H02M 3/158; H02M 3/1584
See application file for complete search history.

(56) References Cited

U.S. PATENT DOCUMENTS

| | | | | |
|---|---|---|---|---|
| 4,683,529 A | * | 7/1987 | Bucher, II | H02M 1/4225 323/207 |
| 4,761,725 A | * | 8/1988 | Henze | H02M 1/4225 323/222 |
| 4,885,675 A | | 12/1989 | Henze et al. | |
| 8,461,816 B2 | * | 6/2013 | Sreenivas | H02M 3/1584 323/272 |
| 9,325,239 B2 | * | 4/2016 | Suga | H02M 3/158 |
| 2012/0087159 A1 | | 4/2012 | Chapman et al. | |
| 2014/0097808 A1 | * | 4/2014 | Clark | G05F 1/170 323/208 |
| 2015/0032396 A1 | * | 1/2015 | Pazhayaveetil | H03G 3/004 702/65 |

OTHER PUBLICATIONS

Ye Z. and Sun B., "Advanced Digital Controls Improve PFC Performance", from Texas Instruments Power Supply Design Seminar, 2012.

Tran P. V., et al., "Using Input Condition Monitoring to Improve the Stability of Digitally Controlled Power Factor Correcting Converters", IEEE 2010 12th Workshop on Control and Modeling for Power Electronics (COMPEL).

Erickson, R. W. and Maksimovic D., Fundamentals of Power Electronics, 2nd ed. Springer, 2001.

High Power Factor Preregulator for Off-Line Power Supplies, Lloyd, H. Dixon Jr. (Unitrode (now Texas Inst.) Power Supply Design Seminar, SEM-800, 1991).

(Continued)

*Primary Examiner* — Harry Behm
*Assistant Examiner* — Peter Novak

(57) ABSTRACT

Aspects of the present disclosure are directed to method, circuits, and apparatuses for power conversion. In an example embodiment, an apparatus includes a boost converter having a current loop affected by at least one compensation correction parameter and variation in an inductance of the current loop. The apparatus also includes a power factor correction means, including a circuit, configured and arranged to adaptively modify the compensation correction parameter based on variation in the inductance of the current loop.

10 Claims, 3 Drawing Sheets

(56) References Cited

OTHER PUBLICATIONS

Wang, "A Novel ZCS-PWM Power-Factor Preregulator with Reduced Conduction Losses", IEEE Transactions on Industrial Electronics, vol. 52, No. 3, Jun. 1, 2005.

Yu Qin et al, "Fuzzy logic and digital PI control of single phase power factor preregulator for an online UPS-a comparative study", Industrial technology, 1996. Proceedings of the IEEE International Conference in Shanghai, China; Dec. 2-6, 1996.

\* cited by examiner

INDUCTANCE VARIATION BASED COMPENSATION IN BOOST CONVERTER

Aspects of various embodiments of the present disclosure are related to power factor correction in power converters.

A boost converter is a type of switching power supply capable of providing a regulated output voltage that is higher than a rectified input voltage. An example boost converter includes an inductor, an output capacitor, and a switching circuit. The switching circuit adjusts current paths in the boost converter to alternately charge and discharge the inductor and an output capacitor. In a first mode, the switching circuit adjusts current paths to charge an inductor. In a second mode, the switching circuit adjusts current paths to transfer charge from the inductor to the output capacitor. Voltage across the output capacitor is provided as an output voltage of the boost converter.

The inductance exhibited by the inductor of a boost converter depends on a biasing current through the inductor. For example, inductance exhibited by an inductor may decrease as current through the inductor is increased. For ease of reference, the current through the inductor may be referred to as a choke current. The relationship between the inductance and the choke current is particularly apparent when the core of an inductor is composed of magnetic powder. Inductors having magnetic powder cores are widely used power converters because they exhibit soft saturation, low cost, and high power density.

Due to the relationship between the inductance and the choke current, inductance exhibited by the inductor may vary under different operating conditions (e.g., different load conditions). Such variation of inductance can make it difficult to adjust switching control of a power converter for optimal efficiency. For example, some boost converters use a feedback loop having a constant gain to control switching circuitry that switches the boost converter between the first and second modes of operation. The gain of the feedback loop may be set, for example, based on a minimum inductance corresponding to a maximum choke current at a minimum input voltage and full output power. However, if operating conditions cause choke current to decrease, the inductance exhibited by the inductor is increased—thereby decreasing cross-over frequency of the boost converter and resulting in a poor power factor and poor total harmonic distortion (THD).

Various example embodiments are directed to methods, circuits, and apparatuses for power conversion.

Methods are disclosed for power conversion. In an example embodiment, a boost converter is provided. The boost converter includes a current loop that is affected by at least one compensation correction parameter and by variation in an inductance of the current loop. Using a power factor correction circuit, the compensation correction parameter is adaptively modified based on variation in the inductance of the current loop.

Circuits and apparatuses for power conversion are also disclosed. In an example embodiment, an apparatus includes a boost converter having a current loop affected by at least one compensation correction parameter and variation in an inductance of the current loop. The apparatus also includes a power factor correction means, including a circuit, configured and arranged to adaptively modify the compensation correction parameter based on variation in the inductance of the current loop.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

Figure 1:
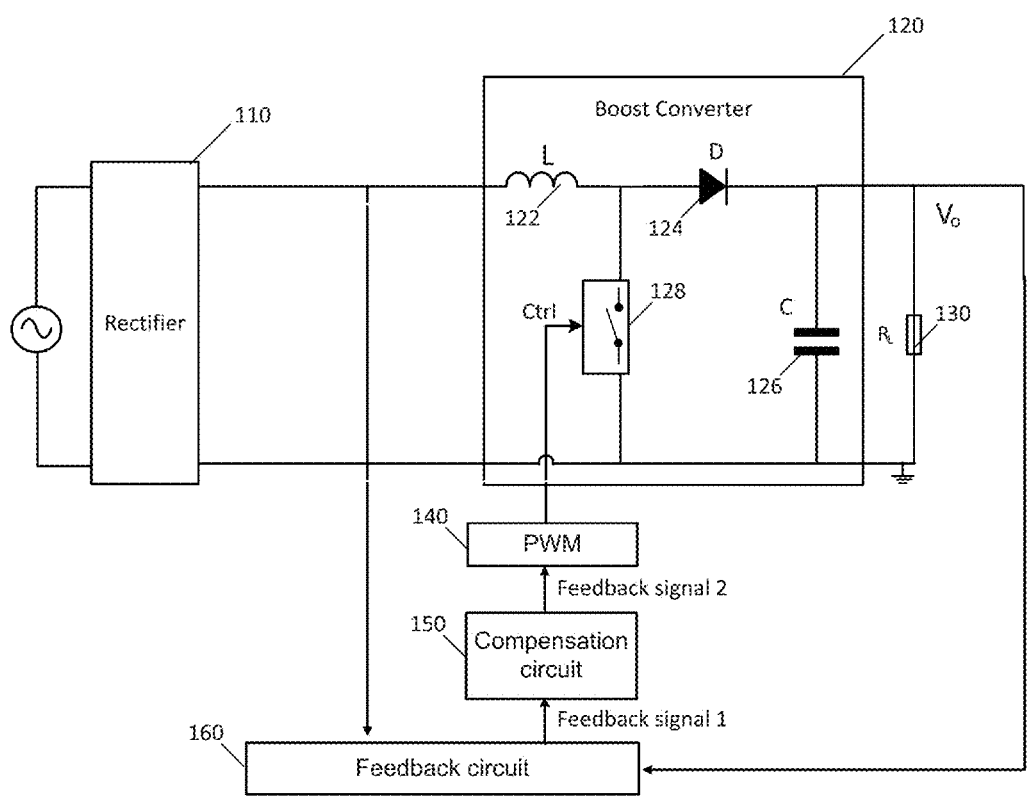
FIG. 1 shows a block diagram of a first power converter circuit, configured in accordance with one or more embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure, including aspects defined in the claims. In addition, the term "example" as used throughout this application is only by way of illustration, and not limitation.

Aspects of the present disclosure are believed to be applicable to a variety of different types of apparatuses, systems and methods involving power conversion. While not necessarily so limited, various aspects may be appreciated through a discussion of examples using this context.

Various example embodiments are directed to methods, circuits and apparatuses for power conversion are disclosed. In an example embodiment, an apparatus includes a boost converter having a current loop affected by at least one compensation correction parameter and variation in an inductance of the current loop. The apparatus also includes a power factor correction means, including a circuit, configured and arranged to adaptively modify the compensation correction parameter based on variation in the inductance of the current loop. The power factor correction means dynamically adjusts the compensation correction parameter, based on the inductance, to mitigate reduction of the power factor of the boost converter due to the variation in the inductance.

In some embodiments, the boost converter includes an inductor in the current loop and a switching circuit. The switching circuit increases current through the inductor when closed, thereby charging the inductor. When the switching circuit is opened, charge is transferred from the inductor to an output capacitor. In some implementations, the switching circuit is configured and arranged to close in response to pulses in a control signal and open when pulses are not present in the control signal. Width of pulses may be adjusted by a pulse width modulator based on a feedback signal to ensure that a desired voltage and/or current is output by the boost converter. The feedback signal may be generated, for example, based on a difference between a measured current through the inductor and a reference current derived from a product of a voltage output by the boost converter multiplied by an input reference voltage.

The power factor correction circuit is configured and arranged to adjust a gain of the feedback signal based on variation in the inductance of the inductor. In some implementations, the power factor correction circuit adjusts the gain of the feedback to exhibit a variation that is substantially equal to a variation in the inductance of the inductor. In some implementations, a power factor correction circuit may adjust the gain based on the reference current used to generate the feedback signal. As the choke current is forced to follow the reference current typical, the reference current exhibits a variation that is proportional to the variation of current through the inductor and may be used to determine variation of inductance of the inductor.

Turning now to the figures, FIG. 1 shows a block diagram of a first power converter circuit configured in accordance with one or more embodiments. The power converter circuit 100 includes a rectifier 110 configured to rectify an AC voltage to produce a DC voltage. A boost converter 120 is connected to receive the DC voltage from the rectifier 110. The boost converter 120 includes an inductor 122, a diode 124, an output capacitor 126, and a switching circuit 128. The switching circuit 128 adjusts current loops in the boost converter 120 to alternately charge and discharge the inductor 122 and output capacitor 126. In a first mode and a second mode, DC current passes from the rectifier 110 through the inductor 122 and diode 124, to the output capacitor 126. In the first mode, the switching circuit 128 is closed to provide an additional current path from the inductor 122 to ground. The current path through the switching circuit 128 increases the current through the inductor 122, thereby charging the inductor. While in the first mode, the diode 124 prevents the current path through the switching circuit 128 from discharging the output capacitor 126. In the second mode, the switching circuit 128 is opened and charge stored in the inductor 122 is transferred to the output capacitor 126 via the diode 124. Voltage across the output capacitor 126 is provided as an output voltage to a resistive load 130.

The opening and closing of the switching circuit 128 is controlled by a feedback loop. In this example, the switching circuit 128 is configured to close in response to pulses in a control signal (Ctrl) output by a pulse width modulator 140. The pulse width modulator adjusts duration of the pulses in response to a feedback signal. The feedback signal is generated by a feedback circuit 160 to ensure that a desired voltage and/or current is output by the boost converter. The feedback signal may be generated, for example, based on a difference between a measured current through the inductor 122 and a reference current. The reference current may be derived, for example from a product of a voltage output by the boost converter 120 multiplied by an input reference voltage.

The power converter circuit 100, includes a compensation circuit 150 configured to adaptively adjust the feedback signal generated by the feedback circuit 160 to compensate for variation in the inductance of the current loop. In some implementations, the compensation circuit 150 is configured to adjust a gain of the feedback signal generated by the feedback circuit 160 based on the inductance exhibited by the inductor 122. The compensation circuit 150 provides the resulting feedback signal to the pulse width modulator 140.

Figure 2:
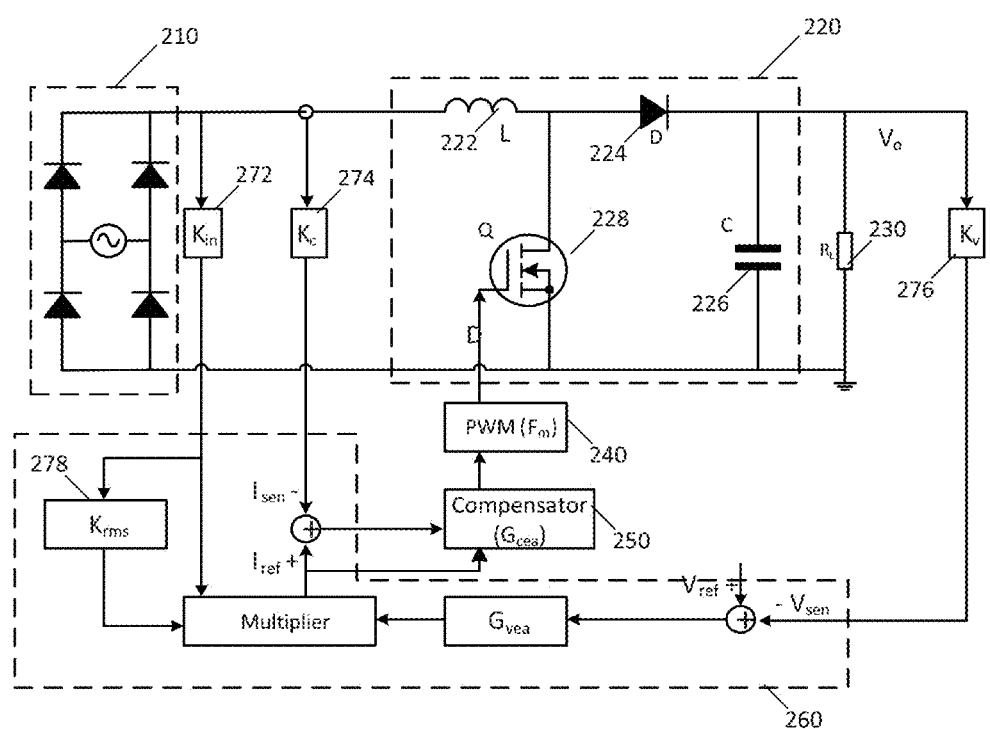
FIG. 2 shows a block diagram of a second power converter circuit, configured in accordance with one or more embodiments.

FIG. 2 shows a block diagram of a power converter circuit configured in accordance with one or more embodiments. The power converter circuit 200 includes a rectifier 210 configured to rectify an AC voltage to produce a DC voltage. A boost converter 220 is connected to receive the DC voltage from the rectifier 210. The boost converter 220 includes an inductor 222, a diode 224, an output capacitor 226, and a switching circuit 228. Arranged as described with reference to inductor 122, diode 124, output capacitor 126, and switching circuit 128 of the boost converter 120 shown in FIG. 1. The voltage across the output capacitor 226 is output to a resistive load 230.

The opening and closing of the switching circuit 228 is controlled by pulses in a control signal (Ctrl) output by a pulse width modulator 240. The pulse width modulator 240 adjusts duration of the pulses in response to a feedback signal. The feedback signal is generated by a feedback circuit 260 to ensure that a desired voltage and/or current is output by the boost converter 220. In this example, the feedback signal is generated by the feedback circuit 260 based on a difference between a measured current through the inductor 222 ($I_{sen}$) and a reference current ($I_{ref}$). The reference current $I_{ref}$ may be generated based on peak detection of an input voltage, a voltage ($V_{sen}$) output by the boost converter 220, an input reference voltage ($V_{ref}$), and the choke current through the inductor 222. In some implementations, various ones of the measured voltages and/or currents may be respectfully scaled by respective scaling circuits (e.g., 272, 274, 276, and 278). For additional information regarding amount of scaling of these voltages and/or currents, reference may be made to *High Power Factor Preregulator for Off-Line Power Supplies*, Lloyd, H. Dixon Jr. (Unitrode (now Texas Inst.) Power Supply Design Seminar, SEM-800, 1991), which is fully incorporated by reference herein.

The reference current for one example implementation may be expressed as:

$$I_{ref} = K_{rms} \cdot G_{vea\_out} \cdot K_{in} \cdot V_{in\_peak} \cdot \sin(\omega t),$$

where $G_{vea\_out}$ is given by $$G_{vea\_out} = G_{vea}(s) \cdot (V_{ref} - V_{sen})$$

and where typical proportional-integral compensation $G_{vea}(s)$ is given by $$G_{vea}(s) = K_{p\_v} \cdot \left(1 + \frac{K_{i\_v}}{s}\right)$$

The power converter circuit 200, includes a compensation circuit 250 configured to adaptively adjust the feedback signal generated by the feedback circuit 260 to compensate for variation in the inductance of the current loop. In some implementations, the compensation circuit 250 is configured to adjust a gain of the feedback signal generated by the feedback circuit 260, based on the inductance exhibited by the inductor 222. The transfer function of proportional-integral compensation performed by the compensation circuit 250 is expressed by:

$$G_{cea}(s) = K_p(I_{ref}) \times \left(1 + \frac{K_i}{s}\right)$$

Where, $K_p(I_{ref})$ is a dynamic gain adjustment performed by the compensation circuit 250. An example dynamic gain adjustment that may be performed is expressed as:

$$K_p(I_{ref}) = K_{Pmax} - K_{ref} I_{ref}$$

The open loop transfer function of the boost converter may be expressed as:

$$G_c(s) = G_{id}(s) \cdot G_{cea}(s) \cdot K_c \cdot F_m = \frac{V_o}{s \cdot L(I_{ref})} \cdot K_p(I_{ref}) \cdot \left(1 + \frac{K_i}{s}\right) \cdot K_c \cdot F_m$$

As long as $K_p(I_{ref})$ keeps same variation as $L(I_{ref})$, the impact of inductance variation to the transfer function can be eliminated and the cross-over frequency can be maximized.

Since the inductance can be approximated to be linear to its biasing current, $$L(I_{ref}) = L_{initial} - K_{choke} \cdot I_{ref}.$$

$L_{initial}$ is the maximum inductance at zero biasing current and $K_{choke}$ is the approximated linear gain. Accordingly, the open loop transfer function is rewritten as $$G_c(s) = G_{id}(s) \cdot G_{cea}(s) \cdot K_c \cdot F_m = \frac{K_{pmax} - K_{ref} \cdot I_{ref}}{L_{initial} - K_{choke} \cdot I_{ref}} \cdot \frac{V_o}{s} \cdot \left(1 + \frac{K_i}{s}\right) \cdot K_c \cdot F_m$$

$K_{pmax}$ is determined by the $L_{initial}$ and loop stability. $K_{ref}$ is calculated to eliminate the variation of $I_{ref}$.

$$K_{ref} = \frac{K_{pmax}}{L_{initial}} \cdot K_{choke}$$

The compensation gain $K_p$ changes adaptively to $I_{ref}$ and the crossover frequency is maximized for different conditions.

Figure 3:
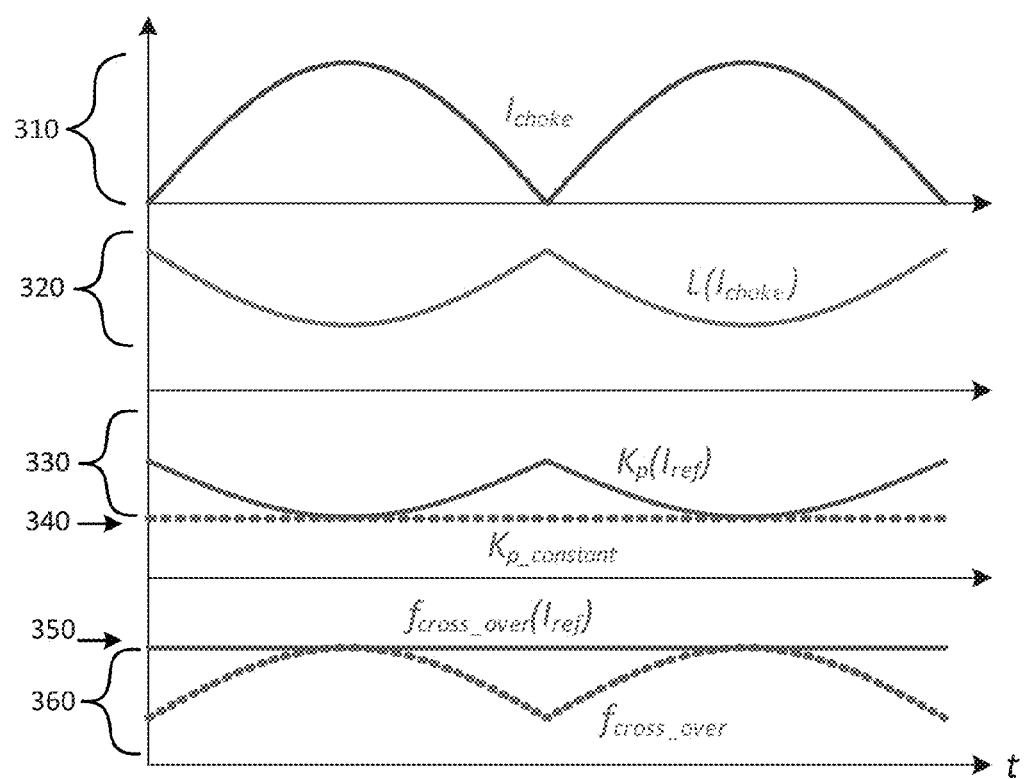
FIG. 3 illustrates example signals that may be exhibited by a boost rectifier during operation.

FIG. 3 illustrates example signals that may be exhibited by a boost rectifier during operation. The first waveform 310 shows an example variation of choke current that may be exhibited during operation of the boost converter over one cycle of the AC voltage input to the rectifier. The second waveform 320 shows variation in inductance exhibited by the inductor as a result of the choke current shown in waveform 310.

Waveform 360 shows an example crossover frequency resulting from the variation in inductance shown in waveform 320 when a constant gain ($K_{p\_constant}$), as shown in waveform 340, is used to adjust a feedback signal. As previously indicated, the feedback loop gain $K_{p\_constant}$ may be calculated to be constant based on minimum inductance at maximum current. Therefore, the crossover frequency, where ac voltage is zero-crossing or lower input current conditions, is reduced when larger inductance. Such reduction in the crossover frequency may lead to current distortion due to limited bandwidth.

Waveform 350 shows an example crossover frequency resulting from the variation in inductance shown in waveform 320 when a gain $K_p$ ($I_{ref}$) is dynamically adjusted based on the inductance of the inductor as shown in waveform 330. As shown in waveform 350, dynamic adjustment of the gain as a function of the inductance can be used to achieve a crossover frequency that is substantially constant across varying operating conditions.

The blocks, modules, circuits and functions shown or discussed with reference to the examples may be implemented using various analog or digital circuits. For example, in some embodiments, a digital control loop may be used to update a feedback signal and/or gain thereof. In some embodiments, an apparatus may include a digitally controlled 750 W power-factor compensated power converter. In one implementation, the converter has 627 uH $L_{initial}$ and 219 uH at OA and 12.5 A bias current, and $K_{choke}$ is 32.6 uH/A. The measured input power factor and THD at adaptive gain is compared with constant gain as shown in Table 1. Power factor can be increased 0.01 averagely at different loading conditions while THD can be decreased as well. By this improvement, more power factor margin of power supply is achieved to pass the international standard, such as PF>0.95 at 50% load by 80plus Platinum for server power supply.

TABLE 1

| Pout (W) @ 230Vac | Adaptive gain | | Constant gain | |
|---|---|---|---|---|
| | PF | iTHD | PF | iTHD |
| 75 | 0.709 | 66.68 | 0.686 | 73.68 |
| 150 | 0.861 | 40.36 | 0.848 | 44.62 |
| 375 | 0.972 | 7.05 | 0.959 | 12.46 |
| 560 | 0.985 | 5.37 | 0.979 | 8.93 |
| 750 | 0.991 | 4.76 | 0.987 | 7.13 |

Some solutions to improve power factor and THD increase the updating frequency of a control loop, so as to reduce the phase delay of digital loop for higher crossover frequency. However, the calculation speed of a control loop is determined directly by microcontroller (MCU) clock speed, which means that higher MCU clock speed has to be used at a higher cost and power consumption. In some embodiments, a digital control loop is configured to update a feedback signal using variable gain based on inductance. The digital control loop can be implemented with low speed MCU, thereby lowering manufacturing costs and power consumption. Some other embodiments may implement a control loop using dedicated hardware peripherals to shorten the phase delay.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., high-speed sampling buffer, or filter). For example, in certain of the above-discussed embodiments, one or more modules are discrete logic circuits or programmable logic circuits configured and arranged for implementing these operations/activities, as in the circuit modules shown in FIGS. 1 and 2. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Further, various aspects of individual embodiments may be implemented as separate embodiments. Such modifications do not depart from the true spirit and scope of various aspects of the invention, including aspects set forth in the claims.

What is claimed is:

1. A method comprising:
   using a boost converter having a current loop, an inductor in the current loop and a switching circuit, with the boost converter being affected by at least one compensation correction parameter and variation in an inductance of the current loop and with the switching circuit being configured and arranged to close in response to pulses of a control signal, the switching circuit increasing current through the inductor when closed;
   using a power factor correction circuit, adaptively modifying the compensation correction parameter based on variation in the inductance of the current loop and adjusting a gain of a feedback signal based on variation in the inductance of the inductor to maintain a substantially constant cross-over frequency of the boost converter; and,
   adjusting a pulse width of the pulses of the control signal based on the feedback signal.

2. The method of claim 1, wherein the adjusting of the gain of the feedback signal by the power factor correction circuit adjusts the gain to exhibit a variation in the gain that is substantially equal to a variation in the inductance of the inductor.

3. The method of claim 1, wherein the boost converter exhibits a power factor that is reduced by variation in the inductance; and
   the adaptive modifying of the compensation correction parameter based on variation in the inductance mitigates reduction of the power factor due to the variation in the inductance.

4. The method of claim 1, further comprising operating the boost converter under multiple load conditions.

5. The method of claim 1, further comprising generating the feedback signal based on a difference between a measured current through the inductor and a reference current derived from a product of a voltage output by the boost converter multiplied with an input reference voltage.

6. The method of claim 5, wherein the adjusting of the gain of the feedback signal dynamically adjusts the gain as a function of the reference current.

7. An apparatus, including
   a boost converter having a current loop affected by at least one compensation correction parameter and variation in an inductance of the current loop; and
   power factor correction circuit configured and arranged to adaptively modify the compensation correction parameter based on variation in the inductance of the current loop;
   a pulse width modulator configured modulate a width of pulses in a control signal based on a feedback signal, wherein
      the boost converter includes an inductor in the current loop and a switching circuit configured and arranged to increase current through the inductor when closed;
      the switching circuit is configured and arranged to close in response to the pulses of the control signal; and
      the power factor correction circuit is configured and arranged to adjust a gain of the feedback signal based on variation in the inductance of the inductor and to maintain a substantially constant cross-over frequency of the boost converter when inductance exhibited by the inductor is increased.

8. The apparatus of claim 7, wherein the power factor correction circuit is configured and arranged to cause a variation in the gain of the feedback signal to be substantially equal to the variation in the inductance of the inductor.

9. The apparatus of claim 7, wherein the power factor correction is configured to generate the feedback signal based on a difference between a measured current through the inductor and a reference current derived from a product of a voltage output by the boost converter multiplied with an input reference voltage.

10. A method comprising:
    using a boost converter having a current loop, an inductor in the current loop and a switching circuit, with the boost converter being affected by at least one compensation correction parameter and variation in an inductance of the current loop and with the switching circuit being configured and arranged to close in response to pulses of a control signal, the switching circuit increasing current through the inductor when closed; and
    using a power factor correction circuit, adaptively modifying the compensation correction parameter based on variation in the inductance of the current loop and adjusting a gain of a feedback signal based on variation in the inductance of the inductor to prevent a cross-over frequency of the boost converter from reducing when inductance exhibited by the inductor is increased.

* * * * *